Figure 1:
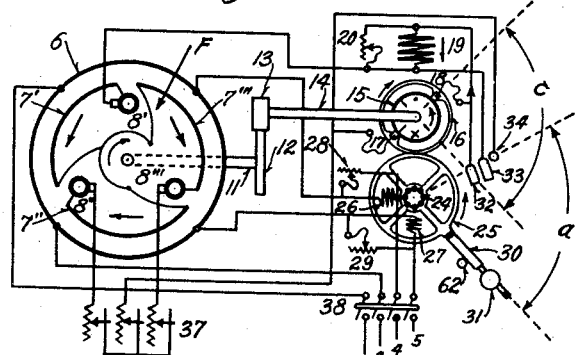

Oct. 22, 1929.    V. A. FYNN    1,732,598
DYNAMO ELECTRIC MACHINE
Filed Jan. 10, 1927    2 Sheets-Sheet 1

Inventor:
Valère Alfred Fynn

Oct. 22, 1929.  V. A. FYNN  1,732,598
DYNAMO ELECTRIC MACHINE
Filed Jan. 10, 1927  2 Sheets-Sheet 2

Inventor:
Valère Alfred Fynn

Patented Oct. 22, 1929

1,732,598

UNITED STATES PATENT OFFICE.

VALÈRE A. FYNN, OF ST. LOUIS, MISSOURI; FRANKLIN AMERICAN TRUST COMPANY, ADMINISTRATOR OF SAID VALÈRE A. FYNN, DECEASED

DYNAMO-ELECTRIC MACHINE

Application filed January 10, 1927. Serial No. 160,240.

My invention relates to dynamo electric machines which can carry variable load at synchronous speed and is particularly applicable to so-called synchronous induction motors and to synchronous condensers. It is also applicable to synchronous generators. Machines which can operate at synchronous speed over one range of loads and at asynchronous speeds over another range of loads are here referred to as synchronous induction motors.

Some of the objects of my invention are to produce a synchronous induction motor, whether operated purely as a motor or as a motor and as a synchronous condenser, or as a synchronous condenser only in which the synchronizing torque is entirely or partly eliminated upon the demand of a torque in excess of the maximum synchronous torque of the machine; in which provision is made to automatically control the out-of-phase-current component taken by the machine when operating as a motor; in which the source of unidirectional current used to produce the unidirectional magnetization on the secondary of the machine at synchronous speeds is protected from the secondary currents generated in the unidirectional magnetization producing winding on the secondary at speeds differing from the synchronous and which can be started without starting gear while developing a sufficient starting torque with a moderate current draw from the line.

Generally speaking, I eliminate the synchronizing torque or reduce it to harmless values by rendering the source of unidirectional current partly or totally ineffective, in so far as the secondary of the synchronous induction machine is concerned, when the load exceeds the maximum synchronous load of the machine. This I can do by disconnecting the source in question from the secondary of the motor and preferably closing said secondary or by preventing the source from generating a unidirectional voltage. I control the magnitude of the out-of-phase component of the current taken by the synchronous induction machine, for instance when operating as a motor, by automatically modifying the magnitude of the useful excitation of the source of unidirectional current or by causing the air-gap resistance in the path of the resultant magnetic flux of the machine to decrease with increasing load or by a combination of one or more of these means. I protect the source of unidirectional current from excessive induction motor currents generated in the secondary preferably by shortcircuiting said source when the machine falls out of synchronism due to an over-load and by concurrently preventing said source from generating an appreciable amount of current. I cause the machine to start without starting gear but with a sufficient torque and without taking an excessive current by providing on the secondary two sets of windings preferably each inductively responsive to the primary along more than one axis per pole pair making the ratio of resistance to reactance of one of the windings greater than the ratio of resistance to reactance of the other winding and utilizing at least part of said other winding to produce the unidirectional magnetization on the secondary of the machine in synchronous operation.

Which of these improvements is to be used and how many of them are to be preferably combined depends not only on the size of the machine but on the use to which it is to be put.

The objects and features of this invention will more fully and clearly appear from the description taken in conjunction with the accompanying drawings and will be pointed out in the claims.

Figure 6:
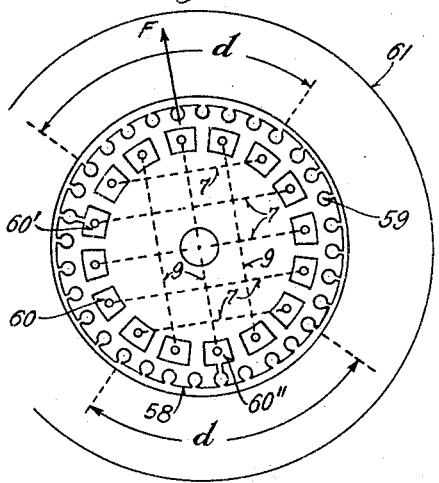
Figure 7:
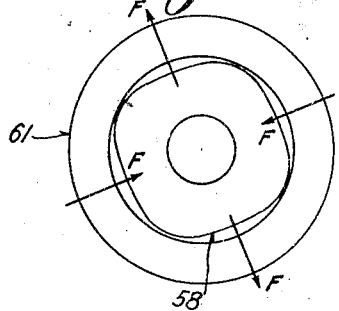

In the accompanying drawings, Figures 1, 2, 3, 4 and 5 show several embodiments of my invention as applied to two-pole dynamo electric machines; Fig. 6 more particularly illustrates the location on the secondary of the two-pole windings 7, 9 and 10 of Figs. 2 and 3 and shows one form of a non-uniform air-gap; Fig. 7 represents a four-pole stator and rotor and shows another form of non-uniform air-gap.

Referring to Fig. 1, this shows a two-pole, two-phase synchronous induction machine 6, 7 driving an auxiliary direct current generator or "exciter" 15, 19 and a relay or automatic switch 24, 26, 27 adapted to control the voltage generated by the auxiliary and the circuits of said auxiliary. The synchronous induction machine comprises a primary two-phase winding 6 adapted for connection to the supply 2, 3, 4, 5 and a star-connected secondary three-phase winding 7', 7'', 7''', the free ends of which are connected to the sliprings 8', 8'', 8'''. The secondary of this machine is mounted on the shaft 11. The direct current auxiliary generator comprises an armature mounted on the shaft 14 and provided with a commuted winding 15 with which cooperate the movable brushes 17, 18 shown in the figure as resting directly on the commuted winding 15. These brushes are mounted in the movable rocker-arm 16. The field structure of the auxiliary generator carries a series winding 19 normally connected in series with the commuted winding 15 and adapted to be shunted by the adjustable resistance 20. The automatic switch or relay comprises a stationary member carrying the windings 26, 27 displaced one from the other by 90 electrical degrees and forming, therefore, a two-phase arrangement of stator windings. The rotor 24 is built like the rotor of an ordinary polyphase motor and is provided with a squirrel cage. Attached to this rotor is a wheel 25 arranged to drivingly cooperate with the movable rocker-arm 16. This wheel 25 insulatingly carries a contact arm 30 on the prolongation of which is mounted a weight 31 which can be moved longitudinally with respect to the prolongation of the contact arm 30. This contact arm is adapted to at times cooperate with the stationary contacts 32, 33, 34. The auxiliary generator is driven from the synchronous induction machine by means of the gear wheels 12, 13. One branch of the three-branch starting resistance 37 is connected to the slipring 8'', another to the slipring 8''' and the third is connected to the slipring 8' through the brush 17, the commuted winding 15, the brush 18 and the series winding 19. The switch 38 permits of the primary 6 of the synchronous induction motor being connected to the line. That phase of 6 which is connected to the phase 2, 5 of the line includes in series with it the energizing winding 27 of the automatic switch. The other phase of the primary 6 includes in series with it the energized winding 26 of the automatic switch and is connected to the phase 3, 4 of the line. The energizing winding 26 is shunted by means of the adjustable resistance 28 and the energizing winding 27 is shunted by means of the adjustable resistance 29. Brush 17 is connected to the contact 34 and brush 18 to the contact blade 32. The contact blade 33 is connected to that end of 19 which is connected to the slipring 8'. If the synchronous induction machine 6, 7, operating as a motor, is connected to drive its secondary in a clockwise direction, then the armature of the auxiliary generator is driven counterclockwise and the connections through the windings 26, 27 are so made that the primary currents circulating in 6 and threading 26 and 27 tend to cause the rotor 24, and therefore the wheel 25, to revolve counterclockwise from its position of rest shown in Fig. 1 and thus move the brushes 17, 18 in a clockwise direction with an increasing primary current in 6. The movement of the rotor 24 is resisted by the weight 31 which can, of course, be replaced by a spring or any other equivalent retarding device. The blade 30 under the control of the automatic switch is adapted to first interconnect the contact blades 32, 33 and later to interconnect these two blades with the contact 34.

Figure 2:
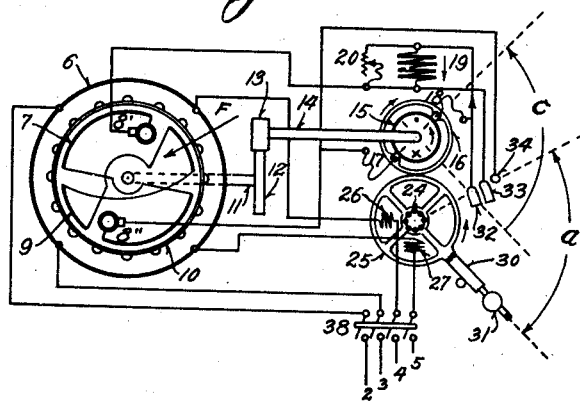

The embodiment shown in Fig. 2 differs from that of Fig. 1 only in that the secondary of the synchronous induction machine carries two sets of secondary windings each set being inductively responsive to the primary along more than one axis per pole pair. One of these windings is the squirrel cage 10 and the other the two-phase winding 7, 9. The phase 9 covers about one-third of each polar arc and is permanently shortcircuited. The phase 7 covers about two-thirds of each polar arc and is connected to the auxiliary generator 15, 19. This circuit as shown in Fig. 2 comprises the slipring 8', the series winding 19, the brush 18, the commuted winding 15, the brush 17 and the slipring 8''. Otherwise the connections are exactly the same as those of Fig. 1. In both of these figures the contact blade 30 of the relay, when near the end of its counterclockwise travel, bridges the contacts 32, 33 thus shortcircuiting the series winding 9 and soon thereafter connects 32 and 33 to 34, thus also shortcircuiting the commuted winding 15 through the brushes 17, 18.

Figure 3:
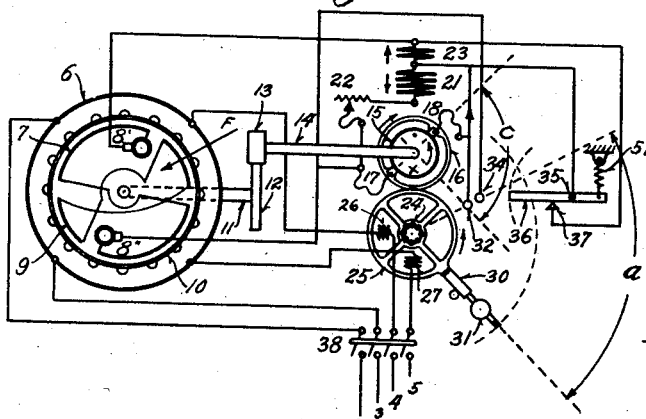

Referring to Fig. 3, the embodiment shown therein differs from that of Fig. 2 in that the auxiliary generator or exciter is shunt instead of series excited, a circumstance which makes it necessary to modify the means for rendering the auxiliary generator inoperative, in so far as the secondary of the synchronous induction motor is concerned, upon the demand of a torque in excess of the maximum synchronous troque of the machine or upon some disturbance which causes the current taken by the synchronous induction machine to rise unduly. The relay or automatic switch 24, 26, 27 is connected to the mains and to the primary winding 6 as in Figs. 1 or 2. The auxiliary is provided with a shunt winding 21 connected to the brushes 17, 18 with the interposition of the adjustable resistance 22 and also with a decompounding winding 23. This decompounding or differential winding is shortcircuited by means of the switch 36 so long as 36 is under the control of the spring 57. The blade 36 of this switch is connected at its pivot 35 to brush 18 and to that terminal of 23 which is common to 23 and to 21, and the other terminal of 23 is connected to the stationary contact 37. The slipring 8″ of 7 is connected to the brush 17 and also to the contact 34. As shown in the figure, the circuit of 7 is closed through the commuted winding 15, the brush 18, the pivot 35, the blade 36, the contact 37 and the slipring 8′. When switch 36 is open then the circuit of 7 is closed through the decompounding winding 23 instead of through the contact 37. Brush 18 is also connected to the contact 32. The blade 30 under the control of the rotor 24 of the automatic switch is adapted to interconnect the contacts 32 and 34, thus shortcircuiting the commuted winding 15 through the brushes 17, 18, but before 30 reaches the contacts 32 and 34 the insulated tip of the prolongation of 30 forces the switch 36 open against the pull of the spring 57 whereby the decompounding winding 23 is thrown into circuit with 7 before 15 is shortcircuited.

Figure 4:
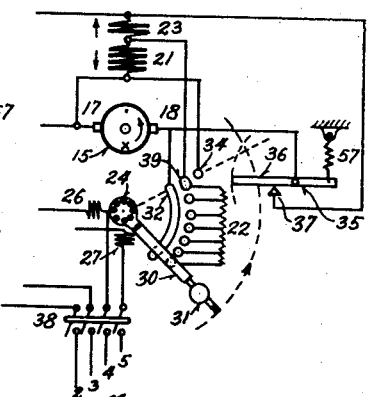

Fig. 4 shows a modification of the circuits of the shunt excited auxiliary generator of Fig. 3. Instead of causing the automatic switch to displace the brushes 17, 18 of the shunt generator, to break the shortcircuit around 23 and to finally shortcircuit the armature of the auxiliary generator, the automatic switch 24, 26, 27 is caused to modify the resistance 22 in circuit with the shunt winding 21, to break the shortcircuit around 23 and to finally shortcircuit the commuted winding 15 through the brushes 17, 18. To this end the gear wheel 25 is omitted and the contact blade 30 is caused to cooperate with the contact segment 32 and with a number of contacts tapping the resistance 22. The last of these contacts, 39, is connected to that terminal of 21 which is common to 21 and to 23; the other terminal of 21 is connected to the brush 17 and to the contact 34, and the other terminal of 23 is connected to the contact 37. The brush 18 is connected to the segment 32 and also to the pivot 35 of the switch 36. As the current in 26 and 27 increases the switch blade 30 travels counterclockwise, reduces the resistance in circuit with the shunt winding 21, interrupts the shortcircuit around the differential winding 23 when the insulated tip of the prolongation of the blade 30 strikes the blade 36 and finally shortcircuits the commuted winding 15 by bridging the contacts 32 and 34.

Figure 5:
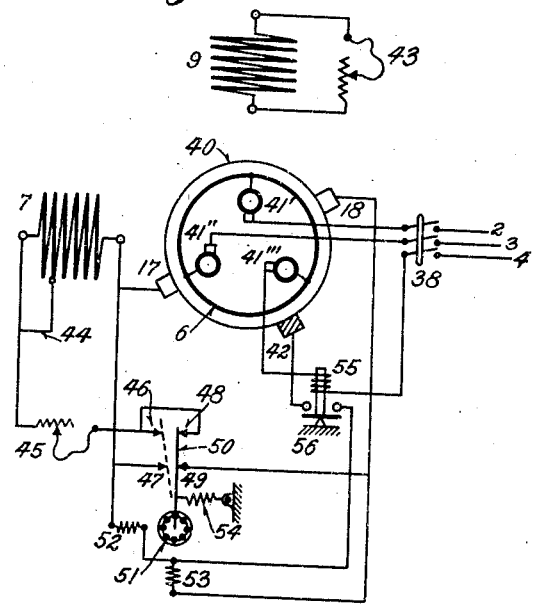

Fig. 5 illustrates one way of applying this invention to a self-excited synchronous induction machine. While the arrangement is shown in connection with a three-phase motor or synchronous condenser, it is also well adapted for use with a single-phase machine of this type. The rotor, here the primary, carries a three-phase winding 6 provided with the sliprings 41′, 41″, 41‴ and cooperating brushes which enable the machine to be connected to the supply 2, 3, 4 by means of the switch 38. The primary also carries a commuted winding 40 with which cooperate the brushes 17, 18 and 42 which are shown as resting directly on the commuted winding. The brushes 17 and 18 are displaced by 180 electrical degrees one from the other, and the brush 42 is displaced by 90 electrical degrees from 17 and 18. The stator carries a two-phase winding, one phase 9 of which is adapted to be closed through the adjustable resistance 43. The other phase, 7, is displaced by 90 electrical degrees from 9, part of 7 is closed by the conductor 44 and one terminal is permanently connected to the brush 17. The other terminal is connected to the contact points 46 and 48 by the automatic switch 51, 52, 53 through the adjustable resistance 45. The contacts 47 and 49 of this automatic switch are connected respectively to the brushes 17 and 18. This automatic switch comprises a stator on which are disposed the two-phase energizing windings 52, 53 displaced by 90 electrical degrees and permanently connected in series between the brushes 17 and 18. The common terminal of 52 and 53 is adapted to be connected to the brush 42 through the relay 55, 56. The moving member of the automatic switch comprises the rotor 51 carrying a squirrel cage winding and the contact blade 50 normally under the control of spring 54 and arranged to normally bridge the contacts 48 and 49 but also capable of bridging the contacts 46 and 47. The relay 55, 56 is normally open, its switch blade then resting on the support 56 but this switch blade is under the control of the electromagnetic coil 55 connected in series between the slipring 41‴ and the conductor 4 of the supply. The connections between the windings 52 and 53 and the brushes 17, 18, 42 are so made that when phase displaced voltages are available at said brushes a counterclockwise torque is exerted by the rotor 51 tending to overcome spring 54 and cause the blade 50 to interconnect the contacts 46 and 47. The coil 55 is so dimensioned that when the primary current of the synchronous induction machine reaches a certain value the relay closes and establishes a connection between the brush 42 and the windings 52 and 53. Brushes 17, 18 are displaced by a small angle from the axis of the secondary winding 7 to which they are normally connected. The displacement is in the direction of rotation of the primary.

When making use of a plurality of windings on the secondary, arranged for instance as shown in Figs. 2 and 3, then I prefer to so dispose these windings that the permanently shortcircuited winding 10 is in substantially better inductive relation to the primary than that winding, such as 7, which is used to produce the unidirectional magnetization on the secondary of the machine at synchronous speeds. If this winding 7 is not inductively responsive to the primary along more than one axis per pole pair and if there is another winding such as 9 which, in combination with 7, is inductively responsive to the primary along more than one axis, then I prefer to make the inductive relation of 9 to the primary about the same as the inductive relation of 7 to that member. In one way of carrying this idea into practice I locate the squirrel cage 10 or its equivalent in slots which are close to the air-gap periphery of the secondary member such as slot 59 of Fig. 6, and I locate the unidirectional exciting winding 7 in other slots set farther back from the air-gap periphery of the secondary, for instance as slot 60 of Fig. 6, and thereby provide a path for magnetic flux to link with one secondary winding without linking with the other. If the winding 7 is a monoaxial winding and is associated with another monoaxial winding such as 9, so as to form a second polyphase winding on the secondary, then I also prefer to dispose a winding such as 9 in slots such as 60 of Fig. 6. In addition to this, I prefer to make the ratio of resistance to reactance of the winding located close to the air-gap periphery greater than the ratio of resistance to reactance of the winding or windings located farther away from the air-gap periphery.

Fig. 6 illustrates one way of arranging the windings 10, 7 and 9 of Figs. 2 and 3 on the secondary of a synchronous induction machine and clearly shows the bridge of magnetic material provided between the series of slots 59 and the series of slots 60. It is, however, not necessary that this magnetic bridge or shunt or by-path be entirely composed of magnetic material. It can readily be interrupted by air-gaps such as are shown at 60' and 60", by way of example. The arrangement of slots and windings shown in Fig. 6, or any equivalent arrangement, is applicable to self as well as to separately excited synchronous induction machines and whether the secondary is the rotor as in Figs. 1, 2, 3 and 4 or whether it is the stator as in Fig. 5.

The objects of this invention can be furthered, or sometimes entirely achieved, by using in any of the embodiments here illustrated and in combination with one or more of the novel devices there shown, or without any of said devices, a non-uniform air-gap between stator and rotor provided, however, that the departure from uniformity is brought about by a suitably modified configuration of the air-gap periphery of the secondary and not of the primary. Thus, in Fig. 6, which represents a two-pole arrangement of secondary windings, the diameter of the rotor 58 is not of an uniform magnitude, being smaller within the arcs $d$ than along the rest of the circumference of the rotor. In the figure the portions with the reduced outer diameter embrace about 90 electrical degrees per pole and are bisected by the axis of the magnetization F produced by the winding 7. In Fig. 6 the air-gap within the arc $d$ is just about twice as great as the air-gap along the rest of the rotor periphery, this last air-gap being usually of the order of magnitude employed in polyphase induction motors.

Fig. 7 represents a primary 61 and a secondary 58 of a four-pole motor. The circumference of the rotor or the configuration of its air-gap surface is such as to provide a gradual change in the air-gap length instead of a sudden change of this length as shown in Fig. 6. The proportions in Fig. 7 are purposely somewhat exaggerated in order to make the figure more clear. In that figure the maximum air-gap is about four times as great as the minimum air-gap, a relation which is not likely to be often required. The winding producing the unidirectional magnetization F on the secondary should preferably be so located as to cause the axis of said magnetization to pass through the center of the longest part of the air-gap as indicated by the arrows F in Fig. 7. While this arrangement is usually preferred, yet for some purposes the axis of F may advantageously be displaced to some extent from that shown in Figs. 6 or 7, as will hereinafter be more particularly explained.

Turning to the mode of operation and referring more particularly to Fig. 1, let it be supposed that the synchronous induction machine there shown is to be operated as a synchronous induction motor. With the machine at rest and not connected to the mains the several elements will be in the position shown in Fig. 1. To start this motor the starting resistance 37 is set to the value corresponding to the desired starting current or starting torque and switch 38 closed. The machine starts just like an ordinary slipring motor, the alternating currents circulating through phase 7', also circulating through the auxiliary generator. If the machine starts or accelerates with less than the primary current corresponding to maximum synchronous load than the contact blade 30 moved by the automatic switch 24, 26, 27 will describe part of the arc $a$, move the brushes 17, 18 towards the neutral position which is that at right angle to the axis of the exciting winding 19 but will fail to interconnect the contacts 32, 33. As the motor approaches synchronism the currents generated in the secondary 7 by the revolving flux produced by 6 tend to die out but by this time the auxiliary generator sends a unidirectional current through said winding 7 and the ampereturns due to said unidirectional current synchronize the machine. The greater the load which the machine has to bring up to synchronism the greater the displacement of 30 from its position of rest and the greater the unidirectional voltage appearing at the brushes 17, 18, provided the displacement of 30 is not so great as to interconnect 32 and 33 and thus shortcircuit 19. In the position of the brushes 17, 18 shown in the figure, the armature reaction weakens the exciting flux of the auxiliary generator. As these brushes are displaced in a clockwise direction, this weakening effect diminishes and after the neutral brush position is past the armature reaction strengthens or adds to the magnetization produced by 19 and thus increases the unidirectional current sent into 7. The greater the load to be synchronized the greater the available unidirectional voltage and therefore the greater the available synchronizing torque. If the load is in excess of the maximum load which a machine can carry at synchronous speed then the contacts 32, 33 will be interconnected by the switch blade 30 and the commuted winding 15 may be shortcircuited at the point 34 and so remain until the load has diminished whereupon blade 30 will move clockwise, interrupt the shortcircuit around 15 and that around 19 and thus permit the machine to synchronize. When in normal synchronous operation the position of blade 30 varies with the load on the motor and because 25 is geared to 16 any change in the position of 30 also changes the position of the brushes 17, 18 of the auxiliary generator with respect to the neutral position of said brushes. As the load decreases so the brushes 17, 18 are moved counterclockwise into a position in which they not only decrease the excitation of the auxiliary but collect less than the maximum available unidirectional voltage on the commutator connected to the winding 15. As the load increases the brushes 17, 18 are moved clockwise and increase the excitation of the auxiliary. When the torque taken exceeds the maximum synchronous torque the blade 30 shortcircuits the series exciting winding 19 at the contacts 32, 33 and thus renders the auxiliary generator or exciter inoperative in so far as the secondary winding 7 of the synchronous induction motor is concerned.

The synchronizing torque produced by the arrangement shown in Fig. 1 is an alternating torque of slip frequency and if allowed to persist after the torque demand exceeds the maximum synchronous torque of the machine, it will cause the speed of the latter to oscillate rapidly or its rotor to "hunt," also causing the current taken by the machine to oscillate rapidly and thus disturb the supply. In addition to this the alternating synchronizing torque will very considerably reduce the maximum non-synchronous overload capacity of the machine if allowed to reappear after the machine has dropped out of synchronism.

This drawback is entirely eliminated by rendering the auxiliary generator inoperative upon a torque demand in excess of the maximum synchronous torque of the machine. If the load is further increased then the blade 30 of the automatic switch moves to its final position in which it not only shortcircuits the exciting winding 19 but also the commuted winding 15, thus protecting the brushes and the commutator and the auxiliary from the large secondary currents circulating in the winding 7 under the conditions named. The automatic switch can be adjusted, for instance by means of the adjustable shunt resistance 28, 29 or by displacing the weight 31 or by changing the position of rest of the blade 30 and consequently of the weight 31. This means a suitable displacement of the stop 62 against which the blade rests and a corresponding displacement of the contacts 32, 33, 34 provided the arc travel of 30 is not to be changed. Further adjustments can be made affecting the power-factor-load-characteristic or the synchronizing capacity of the synchronous induction machine by changing the magnitude of the arc through which the brushes 17, 18 are displaced or by changing the location of this arc with respect to the neutral position of said brushes. The magnitude of the arc can, for instance, be changed by changing the gear ratio between 25 and 16 and the location of said arc with respect to the neutral position of said generator can, for instance, be changed by changing the cogging between 16 and 25. Further adjustments of the "exciting" characteristic of the synchronous induction machine can be achieved by means of the adjustable resistance 20.

Just how the unidirectional ampereturns on the secondary of the synchronous induction machine are to vary with varying load depends, of course, on the duty for which the machine is intended. In order to take full advantage of the asynchronous capabilities of the machine, it is necessary to design the latter with a short air-gap such as is usual in induction motors, but if this is done and the active material of the machine is fully utilized then the change which must be made in the magnitude of the unidirectional ampereturns on the secondary as the load varies from zero to maximum synchronous load is very great indeed if the power factor is to be kept at or near unity throughout. If no change is made in the said unidirectional ampereturns and their magnitude is set for maximum load then the leading out-of-phase component taken by the machine at no-load and at fractional loads becomes excessive and it is for this reason that means are provided in Fig. 1 for regulating the unidirectional ampereturns on the secondary of the synchronous induction machine in dependence upon the load, but to what extent these ampereturns are to be regulated depends, as previously stated, upon the use to which the machine is to be put. In many cases it is permissible and even desirable to have the machine take a certain amount of leading current at no-load and at fractional loads. In such cases a restricted angular displacement of the brushes 17, 18 can be resorted to in Fig. 1 or the air-gap of the synchronous induction machine can be made non-uniform as more particularly shown and described in connection with Figs. 6 and 7. Thus, if the air-gap arrangement of Fig. 6 were applied to Fig. 1, the longer air-gap being located in the path of the magnetization F produced by 7′, 7″ and 7‴, then the leading component of the current taken by the machine at no-load and at fractional loads could be very materially reduced without in any way limiting the maximum synchronous load capacity of the machine and without resorting to any regulation of the unidirectional ampereturns in the winding 7. But, if the asynchronous overload capacity of the machine is not to be sacrificed, then the automatic switch 24, 26, 27 or its equivalent should be used to shortcircuit the exciting winding 19 when the machine is about to drop out or has dropped out of synchronism. If the auxiliary is rendered inoperative when the machine is about to drop out of synchonism then the fact that the auxiliary is rendered inoperative will cause the machine to drop out and this setting is often the most desirable one. If the commutator and the brushes of the auxiliary are to be protected from the secondary overload currents, then the blade 30 should also shortcircuit the armature of said machine when the latter carries overload at sub-synchonous speeds. In such a case the brushes 17, 18 would naturally be placed in the neutral and left in that position throughout the operation of the machine and the gear wheel 25 of the automatic switch would be dispensed with.

The manner in which the non-uniform air-gap achieves the desirable result just set forth is somewhat as follows: Assume that with normal air-gap the unidirectional ampereturns on the secondary of the synchronous induction machine, when operating at maximum synchronous load and at about unity power factor, are three times as great as the ampereturns necessary for producing the resultant magnetization of the machine, then, for zero torque and constant unidirectional ampereturns, the machine must take a current leading the terminal voltage by 90 degrees and equal to twice the primary magnetizing current. Under these conditions the primary ampereturns of the machine at maximum synchronous load will be in excess of the constant unidirectional ampereturns on its secondary and the primary current will lag behind the terminal voltage by some 19 degrees. For zero torque the axis of the magnetization F produced by the unidirectional ampereturns on the secondary coincides with the axis of the resultant flux of the machine. At maximum synchronous load the axis of F is displaced by 90 electrical degrees from the axis of the resultant flux of the machine. Thus, if the air-gap of the machine is changed as indicated in Figs. 6 and 7 and made longer in the axis of F, then in the axis perpendicular to F, then more ampereturns will be required to produce the resultant magnetization of the machine at zero torque than at maximum synchronous torque for the reason that for zero torque the resultant magnetization is in the axis of F and encounters the increased reluctance of the longer air-gap. If the air-gap in the axis of F has been lengthened to an extent, or so changed in its configuration as to require twice as many ampereturns to produce a flux of a given magnitude, then for the proportions chosen for this example the leading current component required by the machine for zero torque will be reduced by one-half but the conditions obtaining under maximum synchronous load will remain as above, for the reason that under maximum load the resultant flux of the machine is produced along an axis along which the length of the air-gap has not been changed.

In practice the conditions are not quite as simple as just stated for the reason that machines of this sort never do operate with zero torque and the actual phase relations are not exactly as stated, also because the average length of the air-gap cannot be altered along one axis without also altering the average length of the air-gap along an axis displaced by one-half a pole pitch. This latter fact is clearly evident in Fig. 6. But, ideal conditions can be closely approximated for instance by giving the secondary member an air-gap outline similar to that illustrated in Fig. 7. In addition the minimum air-gap can be made smaller than the normal air-gap. The points of minimum and maximum air-gap will, usually, be displaced by half a pole pitch.

From the remarks already made, it will be clear that it is not necessary, and often may not be desirable, to have the minimum air-gap displaced by just one-half a pole pitch from the maximum air-gap. By varying the position of the axis of the maximum air-gap with reference to the axis of the unidirectional magnetization produced by the secondary, the out-of-phase-current-load-characteristic can be varied within considerable limits and caused to satisfy many practical requirements without having resort to regulation of the magnitude of the secondary unidirectional magnetization. It is, however, to be borne in mind that when fractional load efficiency is more material than price, then it is preferable to secure the desired operating characteristic, in so far as magnitude of the out-of-phase component is concerned, by varying the unidirectional ampereturns on the secondary with varying load.

A non-uniform air-gap has an effect on the non-synchronous performance of the machine. It causes the magnetizing currents taken by the primary to vary or pulsate and for this reason it is desirable not to overdo the non-uniformity of the air-gap in cases where the machine is designed to often carry overloads at sub-synchronous speeds. The same pulsations are also noted at starting but it is not difficult to keep these within limits which will not interfere with the operation of the machine, nor with the supply.

In Fig. 1 the direction along which phase 7' magnetizes determines the direction of F provided the parallel connected phases 7'' and 7''' have an equal number of turns and an equal ohmic resistance, which is usually the case in ordinary three-phase star-connected windings. For the connections shown the direction of the magnetizations produced by each of the three phases on the rotor is indicated by the small straight arrows placed alongside of said phases and the direction of the resultant unidirectional rotor magnetization is indicated by the arrow F. It is further well to remember in connection with an arrangement such as shown in Fig. 1 that the phase 7' carries twice as much unidirectional current as each of the phases 7'' and 7'''. For this reason said phase should preferably have a correspondingly larger copper cross section. The three-phase secondary could very well be replaced by a two-phase winding such as 7, 9 of Fig. 2, both 7 and 9 being connected to the sliprings 8.

While the auxiliary generator is shown in Fig. 1 as driven by the synchronous induction machine, this arrangement is by no means necessary. The auxiliary generator may be driven in any desired manner and while it is usually preferred to drive it at a constant speed this also is not necessary for the machine is nothing but a direct current generator and any variation in speed merely affects its voltage in a manner well understood.

An advantage of the arrangement shown in Fig. 1 is that it can be applied to any standard slipring induction motor by simply supplying the auxiliary generator and the automatic switch which can readily be made integral with the auxiliary generator, and using this switch for regulating the voltage of the auxiliary generator, for rendering said generator inoperative upon the demand of a torque in excess of the maximum synchronous torque of the synchronous induction machine and for protecting the commutator and the brushes of the auxiliary from secondary asynchronous overload currents. It is clear that one or more of the functions of this auxiliary switch can be dispensed with according to circumstances and as has already been explained.

It is of advantage to wind that secondary winding which produces the unidirectional magnetization F in synchronous operation with as many turns as possible in order to reduce the current and increase the voltage to be handled by the auxiliary generator. A limit is set to the number of turns which can be used on this secondary winding by the voltage generated in said winding at the time of starting.

Reverting to Fig. 2, this differs from Fig. 1 only in that the single secondary polyphase winding 7', 7'', 7''' of Fig. 1 is replaced by two systems of windings, each inductively responsive to the primary along more than one axis per pole pair. One such system is the squirrel cage winding 10; the other comprises the single phase windings 7 and 9 displaced by 90 electrical degrees. The winding 9 is here permanently closed on itself and the winding 7 is here permanently connected to the auxiilary generator. Assuming that the winding 10 is located in the slots 59 of Fig. 6 and the windings 7 and 9 in the slots 60 of that figure, the connections being as shown in Fig. 2 and the air-gap being uniform, the machine can be started and synchronized without the help of starting devices other than the switch 38. In order to secure a sufficiently high starting torque and a reasonably low starting current the ohmic resistance of the squirrel cage 10 must be made high relatively to the ohmic resistance of the windings 7 and 9 and the by-path for magnetic flux between the slots 59 accommodating 10 and the slots 60 accommodating 7 and 9 should be so proportioned that a large percentage of the revolving flux of the machine which threads the rotor as well as the stator can pass through this by-path or bridge. If the connections are so made that the revolving member of the synchronous induction machine rotates clockwise, it will drive the armature of the auxiliary generator counterclockwise and the connections between the primary 6 and the stator windings 26 and 27 of the automatic switch must then be so made that the rotor 24 exerts a counterclockwise torque tending to move the brushes 17, 18 out of their position of rest shown in the figure and in a clockwise direction. How far these brushes will be so moved at starting and how far the contact blade 30 of the automatic switch is moved counterclockwise depends upon the starting current taken by the machine. If this current is in excess of the current corresponding to the maximum synchronous load of the synchronous induction machine, then the brushes 17, 18 will be moved through the arc $c$ and the blade 30 moving through the arc $a$ will not only shortcircuit the series winding 19 at the points 32, 33 but will also shortcircuit the commuted winding 15 at the points 32, 34. As the speed of the synchronous induction machine increases the current through 26 and 27 decreases rapidly unless the torque demand is an unusually large one or exceeds the maximum synchronous torque of the machine. Under these circumstances the motor may not synchronize nor could it do so if 19 and 15 were not shortcircuited. When the load, and therefore the current taken by the machine, diminishes sufficiently the shortcircuit around 15 and 19 is broken whereupon the direct current generator 15, 19 becomes self-exciting, produces a unidirectional voltage and synchronizes the synchronous induction machine. As the load on the synchronous induction machine varies the current through the windings 26 and 27 must vary, causing the wheel 25 to displace the brushes 17, 18, moving them in a direction to increase the unidirectional voltage with increasing load on the synchronous induction machine. Upon the demand of a torque in excess of the maximum synchronous torque the auxiliary generator is first rendered inoperative, in so far as the winding 7 is concerned, and the winding 15 is thereafter shortcircuited in the manner already explained. During the starting operation both systems of polyphase windings on the secondary of the synchronous induction machine produce induction motor torques but the torque per ampere of the winding 10 having the higher ratio of resistance to reactance is considerably greater than the torque per ampere due to the system of windings 7, 9 having the lower ratio of resistance to reactance. Because both systems of windings are polyphase systems the torque produced by each is practically uniform. When synchronism is reached the squirrel cage and the winding 9 become ineffective but the winding 7 produces the unidirectional magnetization on the secondary and is adapted to control the maximum torque and the power factor of the machine. Because 7 is carried in slots such as 60 of Fig. 6 its leakage in synchronous operation is somewhat greater than if it were carried in slots such as 59 of Fig. 6, but this difference in leakage is not material, particularly when slots such as 60 and 59 are connected by narrow slits such as shown, by way of example, at 60′ and 60″ of Fig. 6. Any disadvantage this increase in leakage may have is amply counterbalanced by the advantages gained by the elimination of all starting gear. While the use of starting gear such, for instance, as shown in Fig. 1 in connection with large machines, is acceptable, yet in the case of small synchronous induction machines, particularly in the case of synchronous condensers intended for operation without attendance, the arrangement shown in Fig. 2 is usually to be preferred. This arrangement is also of great benefit in the case of the smaller motors, principally in that it reduces the total cost of the installation without material sacrifice in the performance.

Another important advantage of the arrangement of windings on the secondary of the synchronous induction machine shown in Fig. 2 and specifically in Fig. 6 is the fact that the voltage generated in that winding, 7 of Fig. 2, which carries unidirectional current at synchronous speed, is considerably reduced at the time of starting for the reason that only a small part of the revolving flux threading stator and rotor also threads the winding in question. This circumstance makes it possible to give a winding so located a much larger number of turns than if it were placed in better relation to the primary and without exceeding the permissible value of the voltage generated in said winding at starting. This further means that the auxiliary generator can be designed for a higher voltage and a smaller current.

The arrangement shown in Fig. 2 can be combined with a non-uniform air-gap, for instance as shown in Figs. 6 or 7, the usually preferred arrangement being that in which the axis of the unidirectional magnetization F produced by 7 or its equivalent is located with respect to the longer air-gap as in Fig. 6 or Fig. 7. In Fig. 6 the longer air-gap is practically uniform but embraces for each pole an arc $d$ which is less than the pole pitch and the axis of F bisects the arc or angle $d$. In Fig. 7 the axis of F for each secondary pole coincides with the axis of the longest air-gap for each pole. As previously stated, the relative position of the axis of F with respect to the axis of the longer air-gap need not be as shown in Figs. 6 and 7 but in order to secure the benefits of the air-gap arrangement more particularly shown in these figures the axis of F must not coincide with the shortest air-gap for each pole.

According to circumstances the arrangement shown in Fig. 2 can be operated with advantage in a number of combinations. It can be operated exactly as shown in the figure, the winding 7, 9 and 10 being disposed, for instance, as shown in Fig. 6. If a very large leading current component at no-load is not objectionable or perhaps is even desirable, then the brushes 17, 18 may be located in the neutral of the auxiliary generator and left there throughout the operation of the machine which means that the wheel 25 can be dispensed with. When the synchronous induction machine is called upon to function principally or entirely as a synchronous condenser then the method of operation just outlined will, no doubt, be preferable, power factor adjustments being then made by hand with the help of the adjustable resistance 20. When operating purely as a synchronous condenser the shortcircuiting of 19 or the shortcircuiting of 19 and 15 can sometimes be omitted but when the machine operates as a motor or as a motor and as a synchronous condenser then the features for shortcircuiting 19 or 19 and 15 should be retained. Combining a non-uniform air-gap with the arrangements of windings on the secondary shown in Fig. 2 makes it possible to operate the machine shown in Fig. 2 as a motor without causing it to take an unduly large leading current component at no-load or light loads and without making any provision for adjusting the voltage of the auxiliary generator with varying load. When so operated the feature for shortcircuiting 19 or 19 and 15 is preferably retained.

The winding 9 in the arrangement shown in Fig. 2 can be omitted but this causes the torque of the machine at sub-synchronous speeds to lose its uniformity and this modification can, therefore, be used only where such non-uniform induction motor torque is permissible.

Turning to Fig. 3, this differs from Fig. 2 only in that the auxiliary generator is shunt instead of series excited. The starting performance and possible methods of operation are the same as in Fig. 2 but the means for rendering the auxiliary generator inoperative, in so far as the secondary of the synchronous induction machine is concerned, are different. In the case of a shunt excited machine it is not possible to short circuit the exciting winding and in order to render the auxiliary inoperative by means of said winding it is necessary to either interrupt its circuit or insert a very large resistance into same. Instead it is preferred to demagnetize the field structure of the auxiliary generator by including in circuit with the brushes 17, 18 and the winding 7 the series demagnetizing winding 23 which must be so proportioned that the ampereturns it produces when included in the brush circuit, are at least nearly equal to the ampereturns concurrently produced by the shunt winding 21. There is no disadvantage in dimensioning the winding 23 to produce more ampereturns and thus definitely and quickly "kill" the auxiliary generator. In Fig. 3 this is accomplished by opening the shortcircuit normally shortcircuiting 23. Thereafter, and if necessary or desirable, the commuted winding 15 may be shortcircuited with impunity. When the current taken by the synchronous induction machine of Fig. 3 exceeds, for one reason or another, that value which corresponds to the maximum synchronous load of the machine or some other selected value, the automatic switch 24, 26, 27 brings the insulated prolongation of the blade 30 into contact with the blade 36 of the switch shortcircuiting 23 and opens this switch, thus throwing 23 in circuit with 15 and 7. A further increase in the current taken by the synchronous induction machine then causes the blade 30 to connect the contacts 32 and 34, thus shortcircuiting 15. Apart from this difference the arrangement shown in Fig. 3 can be used exactly as has been explained in connection with Fig. 2. The method of rendering the auxiliary generator inoperative makes no difference to the operation of the other elements of Fig. 3 and certainly is without effect on the arrangement of the windings on the secondary of the synchronous induction machine or on the configuration of the air-gap of the latter.

Instead of adjusting the voltage of the auxiliary shunt generator shown in Fig. 3 by displacing the brushes 17, 18 thereof, the automatic switch 24, 26, 27 can be used as shown in Fig. 4 to adjust this voltage with varying load on the synchronous induction machine, changing the magnitude of the shunt excitation of the auxiliary generator, rendering same inoperative in so far as the secondary of the synchronous induction machine is concerned and shortcircuiting its armature in the manner explained in connection with Fig. 3. In Fig. 4 the wheel 25 is omitted and the switch blade 30 arranged to cooperate with the segment 32 and with a preferably large number of contacts tapping the shunt regulating resistance 22. When there is no current in the primary 6 of the synchronous induction generator or when that current is small the switch blade 30 occupies the position shown in Fig. 4 in which all of the resistance 22 is in circuit with the shunt winding 21 and the voltage at the brushes 17, 18 of the auxiliary generator is a minimum. As the current in 6 increases, the switch blade 30 moves counter-clockwise reducing the resistance in circuit with 21 and consequently increasing the voltage at the terminals of the auxiliary generator. When approaching that value of the current in 6 which corresponds to the maximum synchronous load of the machine with the voltage then available, at the brushes 17, 18, the insulated prolongation of the switch blade 30 approaches the blade 36 of the switch shortcircuiting 23 and it is a matter of selection and adjustment for the designer or user to cause the automatic switch 24, 26, 27 to open switch 36 and throw 23 into circuit with 15 and 7 at that point of the operating characteristic of the synchronous induction machine which best suits the operating conditions to be met.

Usually switch 36 should be opened just as the synchronous induction machine slips out of synchronism or just prior to this occurrence, in which case the opening of the switch 36 will itself cause the synchronous induction machine to depart from synchronism. The substitution of the voltage regulating arrangement of Fig. 4 for the voltage regulating arrangement of Fig. 3 does not limit the possible combinations of the various improvements herein disclosed and more particularly explained in connection with Figs. 1, 2 and 3. In other words, the voltage regulating arrangement disclosed in Fig. 4 can be used whenever such regulation is necessary instead of that disclosed in Figs. 1, 2 or 3 and regardless of the arrangement of windings on the secondary of the synchronous induction machine and regardless also of the configuration of the air-gap of the latter. Thus, it can be used in connection with the secondary windings shown in Fig. 3 or it can be used in connection with the secondary windings shown in Fig. 1 and with or without a uniform air-gap. When the voltage regulating arrangement of Fig. 4 is used the auxiliary generator may or may not be rendered ineffective in so far as the secondary of the synchronous induction machine is concerned and it may or may not be shortcircuited, all according to circumstances and the conditions to be met. Instead of rendering the auxiliary generator inoperative by shortcircuiting its field winding when series excited or by interrupting the circuit of its shunt winding or greatly reducing the current therein when shunt excited or by the use of the decompounding winding in connection with a shunt excited auxiliary as in Figs. 3 and 4, I can achieve the same result without resorting to the use of switches or resistances by displacing the brushes 17, 18 of the auxiliary generator far enough, preferably against the direction of rotation of its commuted winding, to cause said auxiliary generator to lose its excitation. This modification is particularly convenient in cases in which the power-factor-load-characteristic of the machine is at least in part controlled by displacing the brushes 17, 18 of the auxiliary generator. In order to carry out this modification it is merely necessary to suitably increase the arc $c$ through which the brushes 17, 18 are moved or to suitably locate this arc, without increasing it, with respect to the neutral position of the brushes 17, 18. In order to cause the auxiliary machine to lose its excitation by brush displacement, it is not necessary to displace its brushes from the neutral position by more than 90 electrical degrees in the one or in the other direction and particularly when the brushes are displaced against rotation a displacement of less than 90 electrical degrees from the neutral will usually be sufficient to achieve the end in view. After the auxiliary generator has been "killed" by displacing the brushes in the manner described, the commuted winding 15 can be shortcircuited, if desired, in order to protect it and the brushes from the secondary over-load currents. When rendering the auxiliary generator inoperative by excessive brush displacement, it is desirable to cause said brushes to move rapidly to their ultimate position. If the power-factor-load-characteristic of the machine is being influenced by brush displacement then the movement of the brushes from their position of maximum auxiliary voltage to the position in which they render the auxiliary ineffective should be more rapid than their movement over their regulating range of displacement. This is readily achieved for instance as shown in Figs. 1, 2, 3 and 4 where the location of the arc $a$ through which the weight 31 travels is so chosen with respect to the horizontal that during the last part of the travel of 31 its retarding effect diminishes instead of increasing. Since the primary current moving 31 increases continuously and since the torque it produces can be made to increase likewise, for instance by keeping the magnetic densities in the relay 24, 26, 27 low, then it is clear that after 31 passes the horizontal its travel for a given current increment will increase, thus causing the brushes 17, 18 to be displaced at an accelerated rate toward the end of their travel. The same result can, of course, be achieved if a spring is substituted for the weight 31.

Turning to Fig. 5 and assuming that the coil 55 is dimensioned to connect the windings 52, 53 to the brush 42 with a current corresponding to the maximum synchronous load of the machine, the mode of operation will be somewhat as follows: Upon closing switch 38 the resistances 43 and 45 are manipulated to start the machine like an ordinary polyphase induction motor. If the starting current is less than that for which the relay 55, 56 is set then the latter will remain open and the winding 7 will remain closed through the commuted winding 40. Near synchronism the brush current 17, 18 takes control of the situation in a manner now well understood and synchronizes the machine. While at sub-synchronous speeds the voltages appearing at the brushes 17, 42, 18 are alternating voltages of slip frequency and the voltage at the brushes 17, 42 is displaced by 90 electrical degrees with respect to the voltage at the brushes 18, 42. At synchronism all brush voltages become unidirectional. When the maximum synchronous load is reached or just before or just after this point, according to the dimensioning of the coil 55, the relay 55, 56 closes, connecting brush 42 to the common terminal of 52 and 53. If the relay 55, 56 closes before synchronism is departed from, the relay 51, 52, 53 is not usefully energized for the reason that the brush voltages are still unidirectional but so soon as the machine slips out of synchronism said voltages become alternating and the connections between the brushes and the windings 52 and 53 are so made that when polyphase voltages are supplied to said windings the rotor 51 exerts a counterclockwise torque and moves the switch blade 50 into the dotted position shown in Fig. 5, thus breaking connection between the contact points 48, 49 and connecting the contact points 46, 47. This movement of the blade 50 disconnects the winding 7 from the source of unidirectional current rendering said source inoperative in so far as 7 is concerned and shortcircuits 7, thus placing 7 in a position to contribute with 9 to the production of a uniform induction motor torque. The connector 44 permanently closes a part of 7 on itself and may or may not be used. When used it is preferable to give it a considerable resistance and its purpose is merely to bridge the gap between the instant at which 50 leaves the contacts 48, 49 and the instant at which it bridges the contacts 46, 47. When the torque demand is reduced and the primary current in 55 falls below the value for which the relay is set the latter interrupts the connection between 42 and the windings 52, 53 of the automatic switch whereupon blade 50 snaps back into its original position, thus reestablishing the connection between 7 and the brushes 17, 18, whereupon the machine will immediately synchronize and continue to operate synchronously until another over-load occurs. By rendering the source of unidirectional current ineffective in so far as the secondary 7 of the synchronous induction machine shown in Fig. 5 is concerned, upon the demand of a torque in excess of the maximum synchronous torque, the disturbing effect of the nonuniform synchronizing torque upon the induction motor torque of the machine is eliminated and said machine is enabled to carry over-loads asynchronously just as smoothly as any ordinary nonsynchronous induction motor. The synchronizing torque necessarily reappears so soon as this machine departs from synchronism unless the auxiliary voltage available at the brushes 17, 18 is rendered ineffective with respect to 7.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:

1. A dynamo electric machine which carries variable load at synchronous speed, having a primary and a secondary, and means adapted to cause the air-gap resistance in the path of the resultant magnetic flux of the machine to decrease with increasing synchronous load.

2. A dynamo electric machine which carries variable load at synchronous speed, having a primary without defined polar projections, a secondary formed to produce an air-gap of varying length between primary and secondary, and means for producing an unidirectional magnetization along an axis displaced from that in which the air-gap is shortest.

3. A dynamo electric machine which carries variable load at synchronous speed, having a primary and a secondary, a non-uniform air-gap between primary and secondary, a source of current which is unidirectional when the machine runs synchronously, a winding on the secondary connected to said source and located to produce a magnetization along an axis displaced from that axis along which the air-gap is shortest.

4. A dynamo electric machine which carries variable load at synchronous speed, having a primary member with a cylindrical air-gap surface, and a secondary member without defined polar projections and having an undulating air-gap surface forming between the two members an air-gap the length of which changes gradually from a minimum to a maximum and from a maximum to a minimum.

5. A dynamo electric machine which carries variable load at synchronous speed, having a primary and a secondary without defined polar projections, and a non-uniform air-gap between primary and secondary, the length of said air-gap having one minimum and one maximum value per pole.

6. A dynamo electric machine which carries variable load at synchronous speed, having a primary and a secondary, a non-uniform air-gap between primary and secondary, the length of said air-gap having one minimum and one maximum value per pole, a source of current which is unidirectional when the machine runs synchronously, a wind on the secondary connected to said source and located to produce a magnetization along an axis displaced from that of the air-gap minima.

7. A dynamo electric machine which carries variable load at synchronous speed, having a primary member with a cylindrical air-gap surface, and a secondary member having a circumferentially continuous undulating air-gap surface forming between the two members an air-gap the length of which changes gradually from a minimum to a maximum and from a maximum to a minimum, the length of said air-gap having one minimum and one maximum value per pole.

8. A dynamo electric machine which carries variable load at synchronous speed, having a primary with a cylindrical air-gap surface, a secondary, a source of current which is unidirectional when the machine runs synchronously, a winding on the secondary connected to said source, and a non-uniform but continuous air-gap between primary and secondary, the length of said air-gap having alternating maximum and minimum values, and the source connected winding being so located with respect to the maxima and minima of the air-gap that the axis of the magnetization produced by said winding is displaced from the axis of air-gap minima.

9. A dynamo electric machine which carries variable load at synchronous speed, having a primary member with a cylindrical air-gap surface, a secondary member having a non-cylindrical air-gap surface adapted to form a non-uniform air-gap between the two members, the maximum length of said air-gap being nowhere more than about three times greater than the minimum length thereof, and means on the secondary for producing a unidirectional magnetization at synchronism the axis of which approximately coincides with the axis of the maximum length of the air-gap.

10. A dynamo electric machine which carries variable load at synchronous speed, having a primary member with a cylindrical air-gap surface, and a secondary member having an undulating air-gap surface forming between the two members and air-gap the length of which changes gradually from a minimum to a maximum and from a maximum to a minimum, the length of said air-gap having one minimum and one maximum value per pole, and means on the secondary for producing a magnetization which is unidirectional when the machine runs synchronously, the axis of said unidirectional magnetization being displaced from the axis of the minimum air-gap.

11. A dynamo electric machine, having a primary and a secondary, a winding on the secondary, a self-excited direct current generator, having a commutator and brushes, said generator being connected to the winding on the secondary, and means dependent on the load of the machine adapted to move the brushes of the generator into a position in which said generator loses its excitation.

12. A dynamo electric machine, having a primary and a secondary, a winding on the secondary, a direct current generator having a commutator and brushes, said generator being connected to the winding on the secondary, and means dependent on the demand of a torque near to or exceeding the maximum synchronous torque of the machine adapted to move the brushes of the generator into a position in which the voltage at said brushes becomes practically zero.

13. A dynamo electric machine, having a primary and a secondary, a winding on the secondary, a direct current generator having a commutator and brushes, said generator being connected to the winding on the secondary, and means dependent on the synchronous load on the machine adapted to displace the brushes of the generator to increase the generator voltage with increasing synchronous load.

14. A dynamo electric machine, having a primary and a secondary, a winding on the secondary, a series wound direct current generator having a commutator and brushes, said generator being connected to the winding on the secondary, means for shortcircuiting the series winding upon the demand of a torque near to or exceeding the maximum synchronous torque of the machine, and means for thereafter shortcircuiting the armature of the generator.

15. A dynamo electric machine which carries variable load at synchronous speed, having a primary and a secondary, circuits on the secondary inductively responsive to the primary and producing magnetizations along more than one axis per pole pair, a non-uniform air-gap between primary and secondary, and a source of unidirectional current connected to at least one circuit on the secondary to produce a monoaxial magnetization along an axis displaced from the axis of the minimum air-gap length.

In testimony whereof I affix my signature this 7th day of January, 1927.

VALÈRE A. FYNN.